United States Patent
Chae et al.

(10) Patent No.: US 7,450,532 B2
(45) Date of Patent: Nov. 11, 2008

(54) APPARATUS AND METHOD FOR TRANSMITTING DATA BY SELECTED EIGENVECTOR IN CLOSED LOOP MIMO MOBILE COMMUNICATION SYSTEM

(75) Inventors: Chan-Byoung Chae, Seoul (KR); Hong-Sil Jeong, Incheon (KR); Katz Marcos Daniel, Suwon-si (KR); Seok Hyun Yoon, Seoul (KR); Dong-Seek Park, Yongin-si (KR); Chang-Ho Suh, Seoul (KR); Jae-Yoel Kim, Gunpo-si (KR); Young-Kwon Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 312 days.

(21) Appl. No.: 11/005,398

(22) Filed: Dec. 6, 2004

(65) Prior Publication Data

US 2005/0201307 A1    Sep. 15, 2005

(30) Foreign Application Priority Data

Dec. 5, 2003    (KR) ...................... 10-2003-0087896

(51) Int. Cl.
    *H04J 11/00* (2006.01)
(52) U.S. Cl. ...................... 370/310; 455/522
(58) Field of Classification Search ................. 370/310; 455/522, 69
    See application file for complete search history.

(56) References Cited

U.S. PATENT DOCUMENTS

| 6,044,083 A * | 3/2000 | Citta et al. ................. 370/441 |
| 6,847,805 B2 * | 1/2005 | Liu ............................ 455/69 |
| 2002/0114269 A1 | 8/2002 | Onggosanusi et al. |
| 2003/0060173 A1 | 3/2003 | Lee et al. |
| 2003/0108117 A1 * | 6/2003 | Ketchum et al. ............ 375/295 |

FOREIGN PATENT DOCUMENTS

| EP | 1 117 197 | 7/2001 |
| EP | 1 315 311 | 5/2003 |
| WO | WO 02/082689 | 10/2002 |
| WO | WO 03/069800 | 8/2003 |

* cited by examiner

*Primary Examiner*—Matthew Anderson
*Assistant Examiner*—Perez M Angelica
(74) *Attorney, Agent, or Firm*—The Farrell Law Firm, PC (57) ABSTRACT

Disclosed is a method for transmitting/receiving data by use of feedback information in a closed loop multi input multi output (MIMO) mobile communication system. The method includes the steps of feeding back transmission eigenvector selection information determined through a singular value decomposition (SVD) of a channel matrix and transmitting the transmission eigenvector selection information to a transmitter; and receiving the feedback transmission eigenvector selection information, selecting transmission data according to the received transmission eigenvector selection information, mapping the selected transmission data to at least one transmission antenna, and transmitting the transmission data to a receiver.

44 Claims, 5 Drawing Sheets

APPARATUS AND METHOD FOR TRANSMITTING DATA BY SELECTED EIGENVECTOR IN CLOSED LOOP MIMO MOBILE COMMUNICATION SYSTEM

BACKGROUND OF THE INVENTION

1. Field of the Invention

The present invention relates to a mobile communication system, and more particularly to an apparatus and a method for selecting and transmitting a transmission eigenvector in a closed loop multi input multi output (MIMO) mobile communication system.

2. Description of the Related Art

Generally, in a 4G ($4^{th}$ Generation) communication system, which is the next generation communication system, research is ongoing to provide users with services having various quality of service ('QoS') and supporting a transmission speed of about 100 Mbps. Currently, the 3G ($3^{rd}$ Generation) communication system supports a transmission speed of about 384 kbps in an outdoor channel environment having a relatively unfavorable channel environment, and supports a maximum transmission speed of 2 Mbps in an indoor channel environment having a relatively favorable channel environment.

A wireless local area network (LAN) system and a wireless metropolitan area network (MAN) system generally support transmission speeds of 20 to 50 Mbps. Further, the 4G communication system has been developed to ensure mobile station mobility and QoS in the wireless LAN system and the wireless MAN system supporting relatively high transmission speeds. Accordingly, research is ongoing to develop a new communication system capable of supporting a high speed service to be provided by the 4G communication system.

To provide the high speed service (i.e., wireless multimedia service), a broadband spectrum is used. Inter-symbol interference may occur due to a multi-path propagation. The inter-symbol interference may deteriorate the entire transmission efficiency of a system. To compensate for the inter-symbol interference due to the multi-path propagation as described above, an orthogonal frequency division multiplexing (OFDM) scheme has been proposed. In the OFDM scheme, an entire frequency band is divided into a plurality of subcarriers and the subcarriers are transmitted. When the OFDM scheme is used, one symbol duration may increase. Accordingly, the inter-symbol interference can be minimized.

Further, the OFDM scheme is a scheme for transmitting data using multiple carriers and is a special type of a Multiple Carrier Modulation (MCM) scheme in which a serial symbol sequence is converted into parallel symbol sequences and the parallel symbol sequences are modulated with a plurality of mutually orthogonal subcarriers before being transmitted.

In relation to the OFDM scheme, in 1971, Weinstein, et al. proposed that the OFDM modulation/demodulation can be efficiently performed using Discrete Fourier Transform (DFT), which was a driving force behind the development of the OFDM scheme. Also, the introduction of a guard interval and a cyclic prefix as the guard interval further mitigates the adverse effects of the multipath propagation and the delay spread on systems. Although hardware complexity was an obstacle to the widespread implementation of the OFDM scheme, recent advances in digital signal processing technology including fast Fourier transform (FFT) and inverse fast Fourier transform (IFFT) have enabled the OFDM scheme to be implementation in a less complex manner.

The OFDM scheme, similar to an existing Frequency Division Multiplexing (FDM) scheme, boasts of an optimum transmission efficiency in a high-speed data transmission because the OFDM transmits data on subcarriers, while maintaining orthogonality among them. The optimum transmission efficiency is further attributed to good frequency use efficiency and robustness against multipath fading in the OFDM scheme. More specifically, overlapping frequency spectrums lead to efficient frequency use and robustness against frequency selective fading and multipath fading. The OFDM scheme reduces effects of ISI through the use of guard intervals and enables the design of a simple equalizer hardware structure. Furthermore, because the OFDM scheme is robust against impulse noise, it is increasingly popular in communication systems.

A Multiple Access scheme based on the OFDM scheme is an orthogonal frequency division multiple access (OFDMA) scheme. In the OFDMA scheme, some of the subcarriers are reconstructed into a subcarrier set and the subcarrier set is assigned to a specific mobile subscriber station (MSS). In the OFDMA scheme, it is possible to perform a dynamic resource allocation capable of dynamically allocating a subcarrier set assigned to a specific mobile subscriber station according to fading of a wireless transmission path.

Further, for high speed data transmission, methods using a multiple antenna in both a transmitter and a receiver have been developed. Starting from a space time coding (STC) method proposed by Tarokh in 1997, a Bell Lab Layered Space Time (BLAST) method devised by Bell Laboratories has been proposed. In particular, since the BLAST method has a transmission rate linearly increased in proportion to the number of transmission/reception antennas, it has been applied to a system targeting high speed data transmission.

Existing BLAST algorithms have been used in an open loop method. In such a case, since the aforementioned dynamic resource allocation is impossible, a closed loop method has been recently devised. Among the BLAST algorithms, a representative algorithm is the algorithm for a singular value decomposition multi input multi output (SVD-MIMO) system, in which a matrix-type channel is converted into channels corresponding to the number of virtual transmission/reception antennas by using an SVD technology used in a linear algebra.

The SVD technology will be briefly described to aid in the understanding of the SVD-MIMO system.

Before a description on the SVD technology is given, an eigenvalue decomposition (EVD) will be described. When the product of a m×m square matrix A by a predetermined vector $\chi$ having a size of m×1 is equal to the product $\lambda\chi$ of a complex number $\lambda$ by the vector $\chi$, Equation 1 may be obtained.

$$A\chi = \lambda\chi \quad (1)$$

In Equation 1, the $\lambda$ denotes an eigenvalue of matrix A and the $\chi$ denotes an eigenvector. In order to obtain the vector $\lambda$, the $\lambda$ satisfying Equation 2 is determined.

$$\det(A - \lambda I) = 0 \quad (2)$$

In Equation 2, the det denotes a determinant of a matrix. The vector $\chi$ satisfying Equation 1 is determined from the $\lambda$ obtained from Equation 2. For instance, Equation 3 is used to calculate eigenvalues and eigenvectors for a matrix $$A = \begin{bmatrix} 4 & -5 \\ 2 & -3 \end{bmatrix} \cdot \det(A - \lambda I) \quad (3)$$
$$= \det\begin{bmatrix} 4-\lambda & -5 \\ 2 & -3-\lambda \end{bmatrix}$$
$$= \lambda^2 - \lambda - 2 = 0;$$
$$\lambda_1 = -1, \lambda_2 = 2$$

In Equation 3, the eigenvectors for the $\lambda_1=-1$ and the $\lambda_2=2$ can be calculated by Equations 4 and 5.

$$(A-\lambda I)x = \begin{bmatrix} 5 & -5 \\ 2 & -2 \end{bmatrix}\begin{bmatrix} y \\ z \end{bmatrix} = \begin{bmatrix} 0 \\ 0 \end{bmatrix}; x_1 = \begin{bmatrix} 1 \\ 1 \end{bmatrix} \quad (4)$$

$$(A-\lambda I)x = \begin{bmatrix} 2 & -5 \\ 2 & -5 \end{bmatrix}\begin{bmatrix} y \\ z \end{bmatrix} = \begin{bmatrix} 0 \\ 0 \end{bmatrix}; x_2 = \begin{bmatrix} 5 \\ 2 \end{bmatrix} \quad (5)$$

A method for calculating the eigenvectors as described above may be summarized according to the following steps:

step 1) calculate the determinant of the $(A-\lambda I)$;

step 2) calculate a root of step 1) and calculate eigenvalues; and step 3) calculate eigenvectors satisfying the $A\chi=\lambda\chi$ for the eigenvalues calculated in step 2).

When the calculated eigenvectors are linearly independent from each other, the matrix A may be reconstructed by means of the calculated eigenvalues and eigenvectors. A matrix D may be defined by Equation 6, in which the eigenvalues are employed as diagonal elements, and the remaining elements, except for the diagonal elements, are 0.

$$D = \begin{bmatrix} \lambda_1 & 0 & \cdots & 0 \\ 0 & \lambda_2 & \cdots & 0 \\ \vdots & \vdots & \cdots & \vdots \\ 0 & 0 & \cdots & \lambda_m \end{bmatrix} \quad (6)$$

Further, a matrix S arranging the aforementioned eigenvectors in a column may be defined by Equation 7.

$$S = [x_1 \; x_2 \ldots x_m] \quad (7)$$

When matrix A is defined on the basis of matrix D defined by Equation 6, and matrix S defined by Equation 7, matrix A may be expressed by Equation 8.

$$A = SAS^{-1} \quad (8)$$

When the aforementioned example is applied to Equation 8, the $$A = \begin{bmatrix} 4 & -5 \\ 2 & -3 \end{bmatrix}$$

may be expressed by Equation 9.

$$A = \begin{bmatrix} 4 & -5 \\ 2 & -3 \end{bmatrix} = \begin{bmatrix} 1 & 5 \\ 1 & 2 \end{bmatrix}\begin{bmatrix} -1 & 0 \\ 0 & 2 \end{bmatrix}\begin{bmatrix} 1 & 5 \\ 1 & 2 \end{bmatrix}^{-1} \quad (9)$$

Hereinafter, the SVD will be described based on the aforementioned EVD.

First, the EVD can be obtained only for a square matrix. Accordingly, a method similar to the EVD may be used for a m×n matrix which is not a square matrix. That is, when a matrix B, which is not a square matrix, is defined, matrix B may be factorized as expressed by Equation 10.

$$B = UDV^H \quad (10)$$

In Equation 10, the U is the aforementioned m×m unitary matrix and the eigenvectors of a $BB^H$ constitute the columns of the U. The eigenvectors of a $B^HB$ constitute the columns of the V which is a n×n matrix. Further, singular values (diagonal elements of the matrix D) are square roots of the values (except for 0) among the eigenvalues of the $BB^H$ or the $B^HB$.

The aforementioned SVD can be applied to the MIMO system by the following method.

When it is assumed that the number of transmission antennas is $N_T$ and the number of reception antennas is $N_R$ in the MIMO system, a channel H carrying data transmitted from a transmitter until the data are received in a receiver may become a random matrix of $N_R \times N_T$. In such a case, when the channel matrix H is separated through the SVD scheme, the matrix H may be expressed by Equation 11.

$$H = UDV^H \quad (11)$$

In Equation 11, the U is a $N_R \times N_R$ unitary matrix and the eigenvectors of a $HH^H$ constitute the columns of the U. The U will be referred to as a reception eigenvector matrix. Further, the eigenvectors of a $H^HH$ constitute the columns of the V which is a $N_T \times N_T$ matrix and the V will be referred to as a transmission eigenvector matrix. Further, the singular values (diagonal elements of the matrix D) are the square roots of the values (except for 0) among the eigenvalues of the $HH^H$ or the $H^HH$. The D will be referred to as a singular value matrix. Further, the operator H used as a superscript denotes a complex conjugate transpose operation (Hermitian).

A communication system using a multiple antenna may be generally expressed by Equation 12.

$$Y = HX + N \quad (12)$$

In Equation 12, the Y denotes a reception symbol matrix of a $N_R \times 1$ and the X denotes a transmission symbol matrix of a $N_T \times 1$. Further, the H denotes a channel matrix of a $N_R \times N_T$ and the N denotes an additive white Gaussian noise (AWGN) matrix of the $N_R \times 1$. The symbol matrix X to be transmitted is transmitted through the channel of the matrix H. The symbol matrix X is transmitted to a receiver, and includes the matrix N which is noise component.

The SVD-MIMO system will be described by use of the aforementioned SVD scheme.

When a transmitter uses a pre-filter such as a matrix V, the transmission symbol matrix X may be expressed by Equation 13.

$$X' = V \cdot X \quad (13)$$

Further, when a receiver uses a post-filter such as a matrix $U^H$, the reception symbol matrix Y may be expressed by Equation 14.

$$Y' = U^H \cdot Y \quad (14)$$

Accordingly, the SVD-MIMO system in which the transmitter uses the matrix V as a pre-filter and the receiver uses the matrix $U^H$ as a post-filter may be expressed by Equation 15.

$$Y' = U^H \cdot Y = U^H HVX + U^H N \qquad (15)$$
$$= U^H UDV^H VX + U^H N$$
$$= DX + U^H N$$

When Equation 15 is decomposed according to each element of each matrix, Equation 15 may be expressed as Equation 16. For convenience of description, it is assumed that $N_T \leq N_R$.

$$Y' = \begin{bmatrix} y'_1 \\ y'_2 \\ \vdots \\ y'_{N_R} \end{bmatrix} = \begin{bmatrix} \lambda_1 & 0 & \cdots & 0 \\ 0 & \lambda_2 & \cdots & 0 \\ \vdots & \vdots & \cdots & \vdots \\ 0 & 0 & \cdots & \lambda_{N_T} \end{bmatrix} \begin{bmatrix} x_1 \\ x_2 \\ \vdots \\ x_{N_T} \end{bmatrix} + \begin{bmatrix} n'_1 \\ n'_2 \\ \vdots \\ n'_{N_R} \end{bmatrix} \qquad (16)$$

As expressed by Equation 16, in the SVD-MIMO, a system transmitting data from a plurality of transmission antennas to a plurality of reception antennas may be regarded as a multiple single input single output (SISO) system. That is, the channel matrix H may be simplified as a channel D including diagonal elements, which are eigenvalues having a less smaller than or equal to min ($N_T$, $N_R$), by the processing of a matrix V in the transmitter and the processing of a matrix $U^H$ in the receiver. As described above, in a state in which the channel H is rearranged by use of the SVD scheme, the transmitter uses a preprocessor and the receiver uses a post-processor, if the transmitter only determines the eigenvector V value, an MIMO channel can be simplified into a plurality of SISO channels for easy analysis. Further, as described above, the SVD-MIMO system changes into plural SISO systems employing the $\lambda_i$ as channel values. The transmitter can perform an optimal dynamic allocation on the basis of the predetermined V and $\lambda_i$. In such a case, the receiver must transmit to the transmitter information related to the V and information related to the $\lambda_i$.

An OFDM system employing the aforementioned SVD scheme will be described with reference to FIG. 1.

Figure 1:
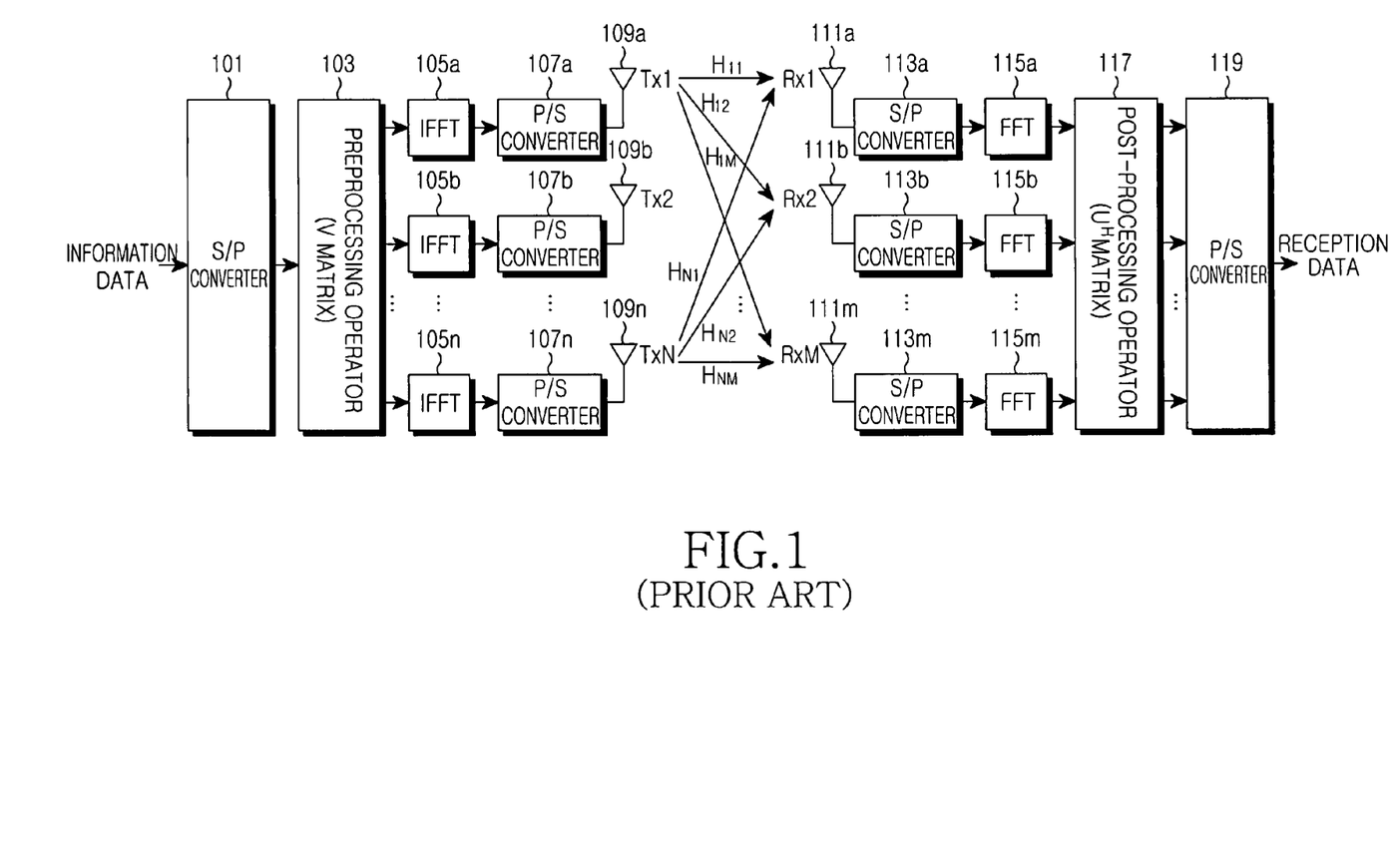
FIG. 1 is a block diagram of an MIMO system according to the prior art.

FIG. 1 is a block diagram of an MIMO system employing an SVD-MIMO scheme according to the prior art.

FIG. 1 shows an example in which the SVD-MIMO scheme is applied to the OFDM system. It is noted that the SVD-MIMO scheme can also be applied to other communication systems, which employ a code division multiple access (CDMA), a time division multiple access (TDMA) or a frequency division multiple access (FDMA), etc., in addition to the OFDM system employing the MIMO.

Data to be transmitted by a transmitter are encoded by a predetermined channel encoder, etc., before being transmitted. For convenience of description, a process after the encoding will be described with reference to FIG. 1.

Referring to FIG. 1, when the encoded data is parallel-converted by a serial-to-parallel (S/P) converter 101, the channel matrix H as described above is multiplied by the matrix V of Equation 1, for which the SVD has been performed, in a preprocessing operator 103. Each calculation result obtained through the multiplication with the matrix V is subjected to an inverse fast Fourier transform (IFFT) through a plurality of IFFT units 105a to 105n mapped to a plurality of transmission antennas, and is then transmitted to a receiver through a plurality of parallel-to-serial converters 107a to 107n and a plurality of transmission antennas 109a to 109n.

The signals transmitted through the plurality (e.g., $N_T$) of transmission antennas 109a to 109n in a transmitter can be received through a plurality (e.g., $N_R$) of reception antennas 111a to 111n in the receiver. That is, the signals transmitted from the first transmission antenna 109a can be received at each of the $N_R$ reception antennas. Herein, the signals received in each reception antenna are received through different channels. Similarly, the signals transmitted from the second transmission antenna or the $N_T$ transmission antenna can be received through the $N_R$ reception antennas. Accordingly, the transmission channel H may be expressed by Equation 17 according to the channels between the transmission antennas and the reception antennas.

$$H = \begin{bmatrix} H_{11} & H_{12} & \cdots & H_{1N} \\ H_{21} & H_{22} & \cdots & H_{2N} \\ \cdots & & & \\ H_{M1} & H_{M2} & \cdots & H_{MN} \end{bmatrix} \qquad (17)$$

The signals transmitted through the transmission channel H are received through each of the $N_R$ reception antennas. The signals received through each of the reception antennas are parallel-converted through serial-to-parallel converters 113a to 113m and are then subjected to an FFT through FFT units 115a to 115m. Then, the received signals for which the FFT has been performed are multiplied by a matrix $U^H$ by the aforementioned SVD scheme in a post-processing operator 117 and are then serial-converted by a parallel-to-serial (P/S) converter 119.

Meanwhile, the receiver of the SVD-MIMO system estimates channel values transmitted from the multiple transmission antenna to the multiple reception antenna, obtains the matrices V, D and U of the matrix H by use of the SVD scheme, and feedbacks the obtained information to the transmitter. When the matrices V and D are transmitted from the receiver to the transmitter, the transmitter can use an optimal resource allocation algorithm according to the channel conditions on the basis of the $\lambda_i$ which is the diagonal elements of the matrix D and is the singular value of the channel H.

However, in such a case, since the receiver must feedback both the matrices V and D to the transmitter, a large quantity of feedback information is required. Further, the SVD system may transmit data through a channel having a small value among eigenvalues which are elements of the matrix D. In such a case, the error probability increases, thereby rapidly deteriorating the transmission efficiency of data. Accordingly, it is necessary to provide a method capable of more efficiently performing data transmission in the SVD-MIMO system.

SUMMARY OF THE INVENTION

Accordingly, the present invention has been made to solve at least the above-mentioned problems occurring in the prior art, and it is an object of the present invention to provide an apparatus and a method capable of performing a highly reliable transmission of data in a closed loop SVD-MIMO system.

It is another object of the present invention to provide an apparatus and a method capable of performing highly reliable transmission of data by selecting and transmitting an eigenvector corresponding to a high singular value in an SVD-MIMO system.

In order to accomplish the aforementioned objects, according to one aspect of the present, there is provided a method for transmitting/receiving data for use as feedback information in a closed loop multi input multi output (MIMO) mobile communication system. The method comprises the steps of feedbacking transmission eigenvector selection information determined through a singular value decomposition (SVD) of a channel matrix, and transmitting the transmission eigenvector selection information to a transmitter and receiving the feedback transmission eigenvector selection information, selecting transmission data according to the received transmission eigenvector selection information, mapping the selected transmission data to at least one transmission antenna, and transmitting the transmission data to a receiver.

In order to accomplish the aforementioned objects, according to another aspect of the present, there is provided a method for transmitting data through a plurality of transmission antennas determined based on information feedback from a receiver in a multi-input multi-output (MIMO) mobile communication system. The method comprises the steps of receiving transmission eigenvector selection information selected and feedback according to a predetermined transmission eigenvector selection method in the receiver and selecting transmission data according to the received transmission eigenvector selection information, mapping the selected transmission data to the transmission antennas, and transmitting the transmission data.

In order to accomplish the aforementioned objects, according to another aspect of the present, there is provided a method for receiving data transmitted through a plurality of transmission antennas in a multi-input multi-output (MIMO) mobile communication system. The method comprises the steps of receiving data transmitted through transmission antennas, performing a singular value decomposition (SVD) for channel conditions between the transmission antennas and reception antennas, determining an amount of transmission data according to a singular value based on a result of the SVD and feedbacking information on the determined amount of the transmission data and transmitting the information to a transmitter.

In order to accomplish the aforementioned objects, according to still another aspect of the present, there is provided An apparatus for transmitting data through a plurality of transmission antennas in a multi input multi output (MIMO) mobile communication system. The apparatus comprises a transmission data selector for performing a singular value decomposition (SVD) for a channel matrix between transmission antennas and reception antennas, receiving selection information on transmission eigenvectors determined by comparing each eigenvalue, which is a diagonal component of a singular value matrix according to a result of the SVD, with a predetermined threshold, and selecting transmission data according to the received transmission eigenvector selection information and a preprocessor for multiplying the transmission data selected by the transmission data selector by a matrix including the transmission eigenvectors, and mapping the transmission data to the transmission antennas.

In order to accomplish the aforementioned objects, according to yet another aspect of the present, there is provided an apparatus for receiving data transmitted through a plurality of transmission antennas in a multi-input multi-output (MIMO) mobile communication system. The apparatus comprises a singular value decomposer for performing a singular value decomposition (SVD) for a channel matrix between transmission antennas and reception antennas and a transmission eigenvector determiner for determining transmission eigenvector selection information by comparing each eigenvalue of a diagonal matrix of a singular value matrix, according to a result of the SVD in the singular value decomposer, with a predetermined threshold, and feedbacking the transmission eigenvector selection information to a transmitter.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment according to the present invention will be described with reference to the accompanying drawings. In the following description of the present invention, a detailed description of known functions and configuration incorporated herein will be omitted when it may obscure the subject matter of the present invention.

described herein is a method and an apparatus for selecting and transmitting a transmission eigenvector for highly reliable communication in a communication system using a closed loop MIMO system. In particular, the present invention proposes a method for transmitting a transmission eigenvector selected for lowering the complexity and improving the performance of a system in the MIMO system ('SVD-MIMO system') using an SVD scheme.

A selective SVD-MIMO system according to an embodiment of the present invention will be described with reference to FIG. 2.

Figure 2:
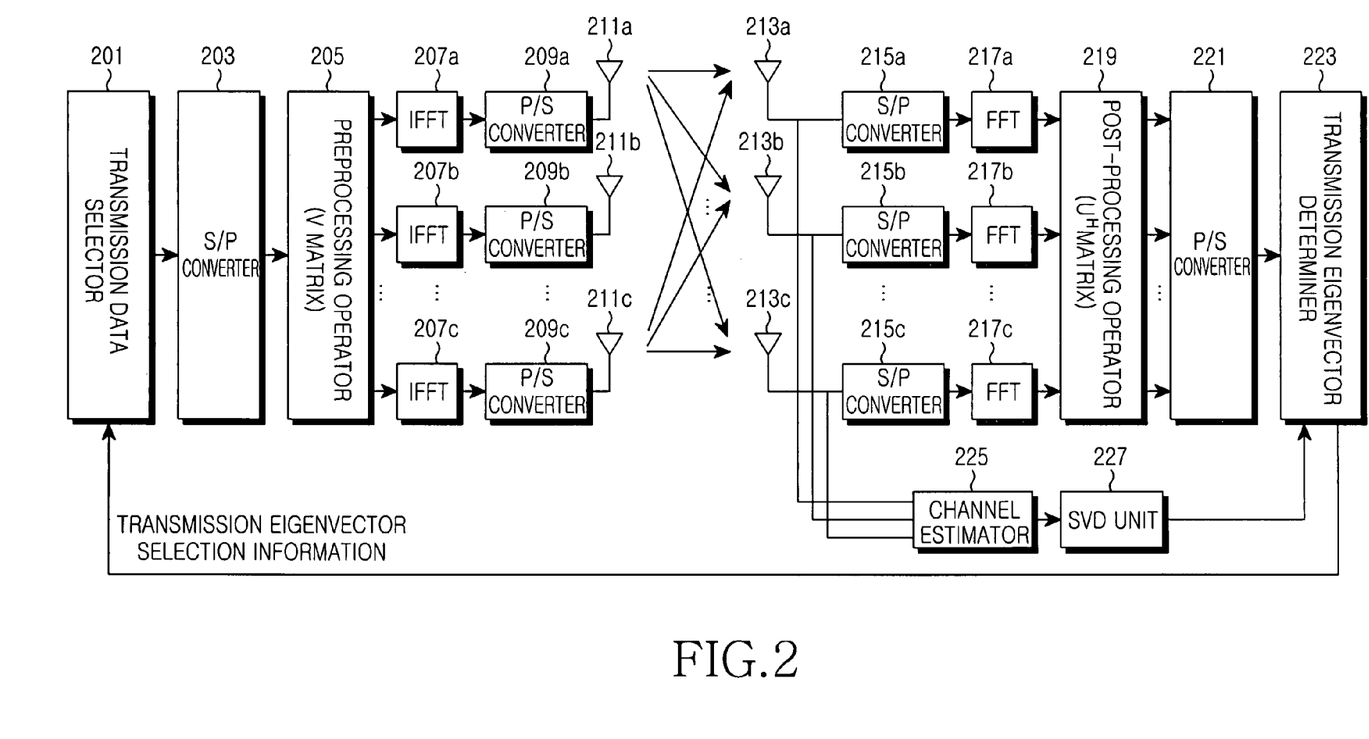
FIG. 2 is a block diagram of a closed loop MIMO system according to an embodiment of the present invention.

FIG. 2 is a block diagram showing the structure of the transceiver of a closed loop SVD-MIMO system according to the embodiment of the present invention. Specifically, for convenience of understanding, the present invention will be described as applied to an OFDM system with reference to FIG. 2. However, since the subject of the present invention is not limited to the OFDM system, the present invention can also be applied to another communication system employing a CDMA, a TDMA or a FDMA, etc.

Further, for convenience of description, FIG. 2 shows a process after data to be transmitted by a transmitter has experienced an encoding process by a predetermined channel encoder, etc. That is, the transmission data after the encoding are subjected to the following process.

First, a transmission data selector 201 selects the transmission data according to transmission eigenvector selection information feedback from a receiver. That is, the transmission data selector 201 receives the transmission eigenvector selection information feedback from a transmission eigenvector determiner 223 of the receiver, selects the transmission data corresponding to the number of eigenvectors of the selection information from the encoded and input data and, then, outputs the selected transmission data. For example, when four antennas transmit only three data according to the feedback transmission eigenvector selection information, the transmission data selector 201 selects only the three information data. The detailed operation of the transmission data selector 201 according to the present invention will be described later.

The output data of the transmission data selector 201 is input to a serial-to-parallel (S/P) converter 203 and the serial-to-parallel converter 203 parallel-converts the serial data. The parallel-converted data is input to a preprocessor 205 and is calculated with a transmission eigenvector matrix V. For example, the output data obtained through multiplication of a $N_T \times N_T$ matrix V and a $N_T \times 1$ matrix in the preprocessor 205 are output as the $N_T \times 1$ matrix. The output data is information data having the number corresponding to the number of eigenvectors selected from the input data matrix, and the rest of the data have a value of 0.

The output data of the preprocessor 205 is transmitted to the receiver through a plurality of transmission antennas 211a to 211c via a plurality of IFFT units 207a to 207c and parallel-to-serial converters 209a to 209c respectively mapped to the transmission antennas.

Next, the data transmitted through a transmission channel H is received through a plurality (e.g., $N_R$) of reception antennas 213a to 213c. The data received through the reception antennas 213a to 213c is parallel-converted through serial-to-parallel converters 215a to 215c. The parallel-converted data is subjected to an FFT through FFT units 217a to 217c. The received data for which the FFT has been performed is multiplied by a $U^H$ matrix by the aforementioned SVD scheme in a post-processing operator 219 and is then serial-converted by a parallel-to-serial (P/S) converter 221.

The receiver of the SVD-MIMO system determines the channel conditions through the received signals, calculates a matrix V from a matrix H estimated from the received signals by use of the SVD scheme, and feedbacks the calculation information to the transmitter.

A channel estimator 225 performs a channel estimation on the basis of the signals received through the reception antennas 213a to 213c. The output values of the channel estimator 225 are subjected to an SVD by an SVD unit 227 and are then output as a $N_R \times N_T$ matrix H. The singular values of the channel matrix H, which is the SVD output result of the SVD unit 227, is input to the transmission eigenvector determiner 223. The transmission eigenvector determiner 223 according to the present invention analyzes a channel condition according to each antenna on the basis of the received signals and the singular values obtained by the SVD scheme, and selects the transmission eigenvectors by use of the analyzed channel condition according to each antenna.

In the above example, it is assumed that a system has 2 ($N_T$=2) transmission antennas and 3 ($N_R$=3) reception antennas, the channel matrix H may be expressed by Equation 18.

$$h = \begin{bmatrix} 2 & 0 \\ 0 & -3 \\ 0 & 0 \end{bmatrix} = \begin{bmatrix} 1 & 0 & 0 \\ 0 & -1 & 0 \\ 0 & 0 & 1 \end{bmatrix} \begin{bmatrix} 2 & 0 \\ 0 & 3 \\ 0 & 0 \end{bmatrix} \begin{bmatrix} 1 & 0 \\ 0 & 1 \end{bmatrix} \quad (18)$$

As expressed by Equation 18, the singular values are 2 and 3. When only the singular value 2 is selected, the transmitter receives the transmission eigenvector 10 corresponding to the singular value 2 and the number 1 of the selected singular values from the receiver.

The selection method of the transmission eigenvector according to the present invention will be described in detail.

The output signal obtained by calculating the signals received in the receiver with the $U^H$ matrix in the post-processing operator 219 becomes a signal of a DX+N as expressed by Equation 15. Matrix D is the eigenvalues of the channel matrix H as described above and is aligned according to a sequence from the largest element toward the smallest element. The magnitude of each value in matrix D tells whether the channel is in a favorable condition or an unfavorable condition. Accordingly, matrix D may be expressed by Equation 19.

$$D = \begin{bmatrix} \lambda_1 & 0 & 0 & \cdots & \cdots & 0 \\ 0 & \lambda_2 & 0 & \cdots & \cdots & 0 \\ \vdots & \vdots & \lambda_r & \cdots & \cdots & 0 \\ \vdots & \vdots & \cdots & \cdots & 0 \\ 0 & 0 & 0 & \lambda_{N_R} & \cdots & 0 \end{bmatrix} \quad (19)$$

$$N_T > N_R \text{ or } D = \begin{bmatrix} \lambda_1 & 0 & 0 & \cdots \\ 0 & \lambda_2 & 0 & \cdots \\ \vdots & \vdots & \lambda_r & \cdots \\ \vdots & \vdots & \cdots \\ 0 & 0 & 0 & \lambda_{N_T} \\ \vdots & \vdots & \vdots & \vdots \\ 0 & 0 & 0 & 0 \end{bmatrix} N_T \le N_R$$

In Equation 19, r is a rank of the channel matrix H and has a value of r min ($N_T$, $N_R$). If the rank of the channel matrix H is smaller than the number of transmission/reception antennas, the $\lambda_i$ for r<i<($N_T$ or $N_R$) has a value of 0 in equation 19. As described above, the $\lambda_i$ (1 i r) is the eigenvalue of the channel matrix H. Herein, if i>j, $\lambda_i$>$\lambda_j$. Herein, the i and j denotes index. That is, the diagonal elements of the matrix D are arranged according to a sequence from the largest element toward the smallest element.

As expressed by Equation 19, in the SVD-MIMO system constructed according to the present invention, the data transmitted through the multiple antennas does not pass through the channel H. Further, a channel may be constructed by multiple SISO channels, and the $\lambda_1$ to $\lambda_T$ may be regarded as an actual channel. That is, as expressed by Equation 19, the system including the transmitter processing the matrix V and the receiver processing the matrix $U^H$ may be regarded as a system in which overlapping signals or parallel signals are transmitted from multiple transmission antennas to multiple reception antennas. Accordingly, when the rank is high, channel capacity can increase.

As described above, the $\lambda_i$ (1 i r) is aligned according to a sequence from the largest element to the smallest element. The size of the $\lambda_i$ (1 i r) indicates the high or low quality of a channel condition for each transmission antenna. Accordingly, when the channel condition is unfavorable for each transmission antenna and, thus, a predetermined condition is not satisfied, the present invention does not transmit data through a corresponding eigenvector by use of the $\lambda_i$ (1 i r).

The eigenvector can be selected in order to reduce the error probability for a transmitted signal. The selection scheme of the eigenvector for reducing the error probability for the transmitted signal will be described.

As described above, the selective SVD-MIMO system may be regarded as a parallel combination of multiple SISO systems. Further, the relation between the transmission data may be expressed by Equation 20.

$$Y' = \begin{bmatrix} y'_1 \\ y'_2 \\ \vdots \\ y'_{N'_R} \end{bmatrix} = \begin{bmatrix} \lambda_1 & 0 & \cdots & 0 \\ 0 & \lambda_2 & \cdots & 0 \\ \vdots & \vdots & \cdots & \vdots \\ 0 & 0 & \cdots & \lambda_{N_R} \\ 0 & 0 & 0 & 0 \end{bmatrix} \begin{bmatrix} x_1 \\ x_2 \\ \vdots \\ x_{N_T} \end{bmatrix} + \begin{bmatrix} n'_1 \\ n'_2 \\ \vdots \\ n'_{N'_R} \end{bmatrix} \text{ or} \quad (20)$$

$$y'_1 = \lambda_1 \cdot x_1 + n'_1$$
$$y'_2 = \lambda_2 \cdot x_2 + n'_2$$
$$\vdots$$
$$y'_r = \lambda_r \cdot x_r + n'_r$$

In Equation 20, $y'_j$ denotes the $j^{th}$ signal of a $N_R \times 1$ matrix obtained by multiplying the received signal by the calculation value ($U^H$) of the post-processing operator 219, $x_j$ denotes an $j^{th}$ transmission signal, and $n'_j$ denotes an $j^{th}$ AWGN signal (variance value of the AWGN is $\sigma_n^2$). Since the $\lambda_j$ is a positive integer, when the $y'_j$ is divided by the $\lambda_j$, the variance value of the AWGN is $$\frac{\sigma_n^2}{\lambda_j^2}.$$

Accordingly, the error probability when the $j^{th}$ data $x_j$ (1 j r) are transmitted may be expressed by Equation 21.

$$P_{e,j} = Q\left(\frac{d_{\min}}{2(\sigma_n/\lambda_j)}\right) \quad (21)$$

In Equation 21, $d_{min}$ represents the shortest distance in a signal space of transmission data. $\sigma_n$ denotes variance value of channel, and Q denotes Q function. When it is assumed that an M-quadrature amplitude modulation (M-QAM) signal is transmitted, and the variance of the signal is $\sigma_s^2$, the $d_{min}$ may be expressed by Equation 22 and the Q function may be expressed by Equation 23.

$$d_{\min} = \sqrt{\frac{6\sigma_s^2}{M-1}} \quad (22)$$

In Equation 22, $d_{min}$ represents the shortest distance in a signal space of transmission data, and $\sigma_s^2$ denotes variance value of transmission signal, and M denotes M-QAM. For example, when the M=4 denotes 4-QAM, and the M=16 denotes 16-QAM.

$$Q(x) = \int_\pi^\infty \frac{1}{\sqrt{2\pi}} \exp\left(-\frac{u^2}{2}\right) du \quad (23)$$

Accordingly, in Equation 21, when the j is sequentially increased from the smallest $\lambda_j$ and thus the average error probability (result of Equation 23) is greater than a predetermined threshold, data is not transmitted. For example, if the average error probability (result of Equation 21) is greater than 0.5, an eigenvector is not selected. Since a method for determining the predetermined threshold is outside from the subject of the present invention, the detailed description will be omitted. Meanwhile, when Equation 24 is satisfied, the transmission of an $j^{th}$ transmission eigenvector is determined based on the $j^{th}$ singular value.

$$P_{e,j} = Q\left(\frac{d_{\min}}{2(\sigma_n/\lambda_j)}\right) < th \quad (24)$$

Specifically, the following eigenvector selection method can be considered in a CDMA system. Since the $\lambda$ values denotes a channel condition according to each transmission antenna in each SVD-MIMO system as described above, the $\lambda_i$ having the smallest value among all of the $\lambda$ values denotes a transmission antenna having the worst channel condition in the SVD-MIMO system. The $\lambda_i$ having the smallest value is expressed by a $\lambda_{min}$. Accordingly, whether to transmit data or not is first determined for a transmission antenna corresponding to the $\lambda_{min}$. Since the $\lambda_{min}$ is channel information related to the transmission antenna having the worst channel condition among channels H transmitted through entire transmission antenna, the $\lambda_{min}$ satisfies Equation 25.

$$\|Hx\| \geq \lambda_{min}\|x\| \quad (25)$$

According to Equation 25, when noise is not considered, the $\|Hx\|$, which is a normal value of a signal after the transmission signal x has experienced the channel H, must be always greater than or equal to the $\lambda_{min}\|x\|$ which is multiplication of the minimum eigenvalue $\lambda_{min}$ and a normal value of the transmission signal x.

Further, when a normal value of a noise signal is greater than half of the minimum distance, an error occurs. This may be expressed by Equation 26.

$$\|n\| \geq \frac{d_{\min}}{2} \quad (26)$$

In Equation 26, $d_{min}$ is the minimum distance on a constellation in the modulation in the transmitter. Accordingly, when it is assumed that the set of all of the transmittable vectors is S, S includes (−1, −1), (−1, +1), (+1, −1) and (+1, +1) in a case of a binary phase shift keying (BPSK). Meanwhile, in the communication system using a multiple antenna, the minimum distance $d_{min}$ may be expressed by Equation 27.

$$d_{min} = \min_{i \neq j} \|H(s_i - s_j)\| \quad (27)$$

As expressed by Equation 27, the minimum distance $d_{min}$ of the reception signal is a minimum value of the distance between the symbols received through the channel matrix H for each transmission symbol ($S_i$, $S_j$).

When the $H(S_i - S_j)$ in Equation 27 is applied to Equation 25, Equation 28 can be obtained.

$$\|H(s_i - s_j)\| \geq \lambda_{min}\|s_i - s_j\| \quad (28)$$

When Equation 28 is put into Equation 27, Equation 29 can be obtained.

$$d_{min} \geq \lambda_{min} \min_{i \neq j} \|s_i - s_j\| \quad (29)$$

In Equation 29, when the minimum distance (i.e., $\min_{i \neq j} \|s_i - s_j\|$) in the transmitter is $d_0$, Equation 29 can be expressed as Equation 30.

$$d_{min} \geq \lambda_{min} d_0 \quad (30)$$

In Equation 30, the minimum distance $d_0$ in the transmitter is a constant value determined according to a modulation scheme. Accordingly, when the minimum eigenvalue $\lambda_{min}$ of the channel H is large, the $d_{min}$ value increases. Therefore, the error probability is reduced. However, the $d_{min}$ value is a fixed value which is not adjustable. When a predetermined channel matrix H is provided, plural antennas are selected and used according to the present invention. Therefore, the error probability can be reduced.

That is, when Equation 30 is put into Equation 26, Equation 31 can be obtained.

$$\|n\| \geq d_{min}/2 \geq \lambda_{min} d_0/2 \quad (31)$$

The criterion for the selection of a transmission antenna according to the embodiment of the present invention is achieved by Equation 31. In Equation 31, $d_0$ is a constant value as described above and the normal value of the noise signal is a value measured through the reception signal. In a general CDMA system, since a transmission signal is multiplied by a spreading sequence before being transmitted, the transmission power and the power of any noise are very small for each one chip. The average power of the reception signal is obtained, so that the power of the noise can be obtained.

As described above, in the matrix D as expressed by Equation 19 obtained from the reception signal by the SVD scheme, whether to select a transmission antenna or not is determined according to the singular value (i.e., $\lambda$ value) of each transmission antenna, which is represented by elements constituting the matrix. In other words, when the $\lambda_{min} d_0/2$ value of a right side is less than the normal value of the noise signal in Equation 31, it is highly probable that an error has occurred in a signal transmitted through a corresponding channel. Accordingly, it is not efficient to transmit data through the corresponding channel.

In contrast, when the smallest $\lambda_{min}$ value among all of the $\lambda$ values exceeds a predetermined value (i.e., state of a corresponding channel becomes favorable) and thus the $\lambda_{min} d_0/2$ value is greater than the normal value of the noise signal, it is preferable to transmit data using the corresponding transmission antenna. Since the eigenvalues for the rest of the channels are greater than the $\lambda_{min}$ value, the eigenvalues satisfy the above condition without determination through Equation 31.

It is preferable to perform the determination for the $\lambda$ value until the condition of Equation 31 is not satisfied (i.e., the $\lambda_{min} d_0/2$ value is greater than the normal value of the noise signal), starting from the $\lambda_{min}$ value. Further, it is preferred not to transmit data through a transmission antenna corresponding to channels satisfying the condition of Equation 31.

The transmission eigenvector selection information determined by the method as described above is feedback to the transmitter from the receiver. Then, the transmission data selector 201 selects a transmission antenna according to the received transmission eigenvector selection information and transmits data through the selected transmission antenna. In the present invention proposed as described above, data is not transmitted through a transmission antenna having bad channel environment, thereby reducing the error probability.

Meanwhile, it is preferred that the receiver feedbacks not only the transmission eigenvector selection information but also information on a vector V in order to employ the SVD scheme as described above. The vector V exists in a size of $(N_T \times N_R)$ every subcarrier.

When the system is a frequency division multiplexing (FDD) system, the information feedback from the receiver is used. However, when the system is a time division multiplexing (TDD) system, it is possible to perform tracking using the transmitted/received data and the pilot signals without the feedback from the receiver. In the TDD system, since transmission data and reception data are time-divided through the same channel environments before being transmitted, it is possible to determine the channels for the transmission data by use of channels estimated through signals received from a receiver.

A data transmission/reception process according to an embodiment of the present invention will be described with reference to FIGS. 3 and 4.

Figure 3:
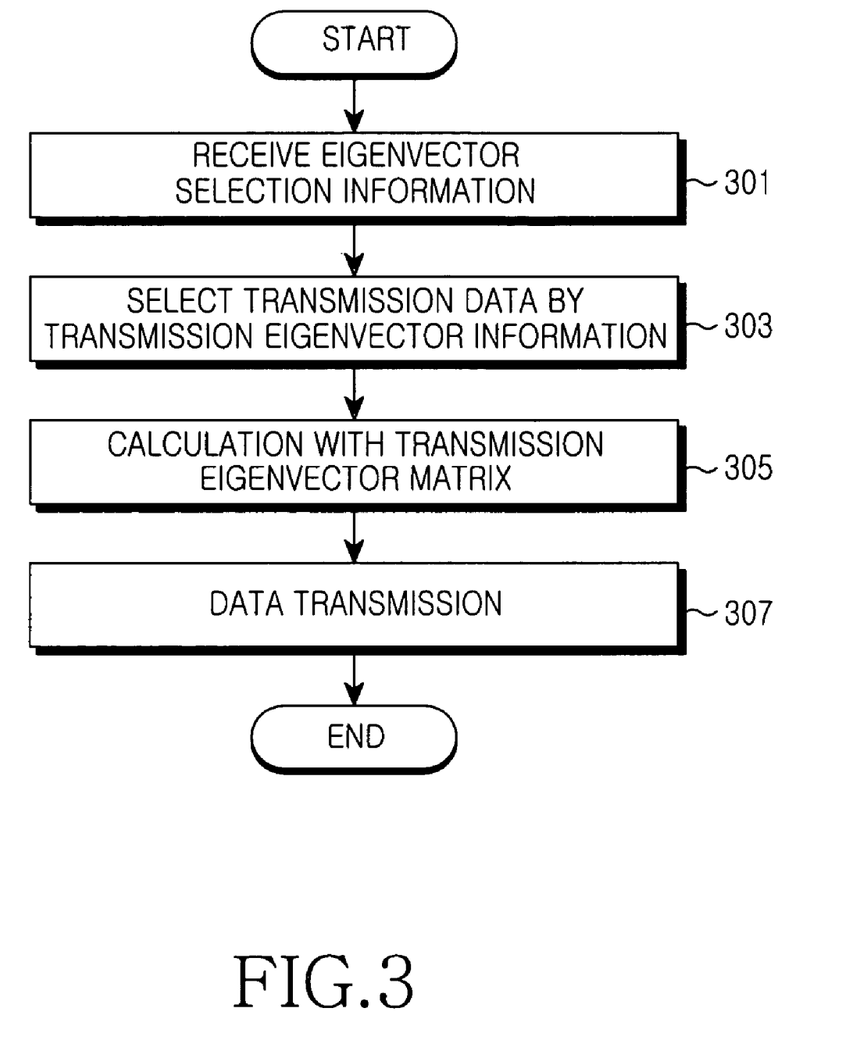
FIG. 3 is a flow diagram illustrating a data transmission method in a closed loop MIMO system according to an embodiment of the present invention.

FIG. 3 is a flow diagram illustrating a data transmission method in a selective SVD-MIMO system according to an embodiment of the present invention.

Referring to FIG. 3, the transmitter receives the transmission eigenvector selection information from the receiver according to the present invention (step 301). The transmission eigenvector selection information is determined by estimating a channel condition according to each transmission antenna by means of the eigenvalues of the matrix D obtained by the SVD scheme, and determining the eigenvalues (i.e., $\lambda$ values) according to each channel condition based on whether or not the error probability of a transmission signal exceeds a reference value, as described above.

Then, the transmitter selects data to be transmitted according to the received transmission eigenvector selection information (step 303). The transmitter maps the data in such a manner that the data is not transmitted through an eigenvector determined not to be transmitted due to a bad channel condition according to the received transmission eigenvector selection information.

A mapping process of data and transmission data performed by the transmission data selector 201 will be described in detail with reference to FIG. 2.

It is assumed that the number of transmission antennas is 4 and the number of reception antennas is 4 (i.e., $N_T=4$, $N_R=4$), and symbols s1, s2, s3 and s4 are initially transmitted. A transmission antenna to be used for the data transmission is determined by applying the normal value of the noise signal and the eigenvalues of the matrix D to the conditions of Equations 24 to 31.

When it is assumed that only the fourth antenna experiences a bad channel in the transmission antenna determination process, the next symbols are transmitted through only the determined transmission eigenvectors until the receiver determines the next channel conditions (i.e., the next transmission eigenvectors are determined). Since the channel condition is not a static condition, it is preferable to check the channel condition continuously and periodically.

In the transmitter, the vector symbols in a standby state together with symbols s5, s6, s7 and s8 are input to the transmission data selector 201. The transmission data selector 201 selects the input symbols so that the input symbols are transmitted through only the first to the third transmission antenna according to the transmission eigenvector selection information feedback from the receiver. That is, since the first to the third transmission antenna are determined to be used by the transmission eigenvector selection information, the transmission data selector 201 calculates the input symbols with the matrix as expressed by Equation 32, so that the input symbols are mapped to the antennas.

$$\begin{pmatrix} 1 & 0 & 0 & 0 \\ 0 & 1 & 0 & 0 \\ 0 & 0 & 1 & 0 \\ 0 & 0 & 0 & 1 \end{pmatrix} \quad (32)$$

Accordingly, when the symbols s5, s6, s7 and s8 are input, the input symbols are multiplied by the matrix as expressed by Equation 32. Then, as a result of the multiplication, only the symbols s5, s6 and s7 are input to the serial-to-parallel converter 203. 0 is mapped as the last data value, that is, a data value calculated with the last eigenvector is 0.

Since the next symbol vector must be transmitted from the symbol s8 again in order to maintain the continuity of the data transmission, the transmission data selector 201 must remember the symbol having not been transmitted.

After the symbol data to be transmitted is mapped to each antenna by the transmission data selector 201, the symbol data is calculated with the transmission eigenvector matrix V according to application of the SVD scheme (step 305). The symbol data having been calculated with the transmission eigenvector matrix V is transmitted through each transmission antenna (step 307).

The data reception process according to an embodiment of the present invention will be described with reference to FIG. 4.

Figure 4:
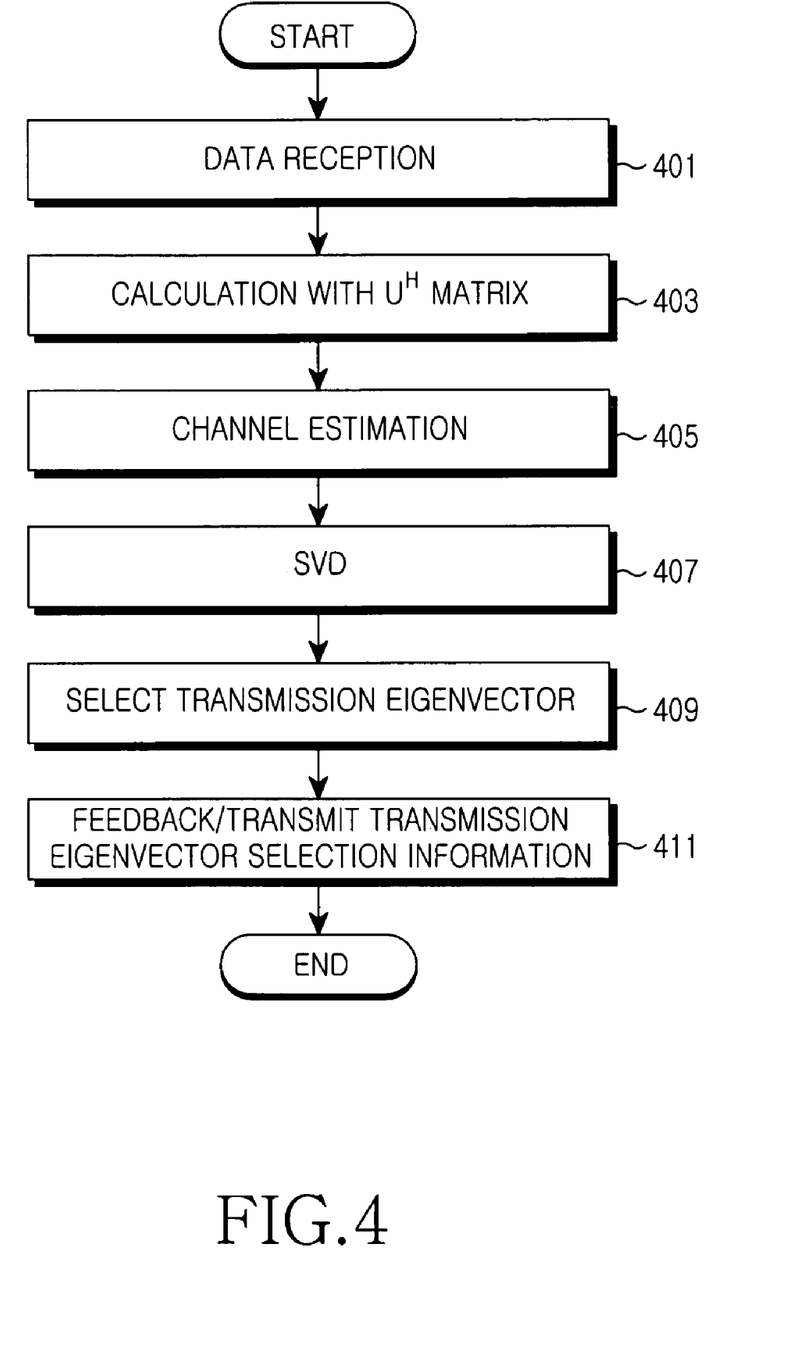
FIG. 4 is a flow diagram illustrating a data reception method in a closed loop MIMO system according to an embodiment of the present invention.

FIG. 4 is a flow diagram illustrating a data reception method in a selective SVD-MIMO system according to an embodiment of the present invention.

Referring to FIG. 4, the receiver receives the data transmitted from the transmitter (step 401). The received data are calculated with the matrix $U^H$ through the post-processor for application of the SVD scheme (step 403). The receiver and then performs a channel estimation through the received data (step 405). Next, the receiver performs an SVD for a channel matrix H obtained through the channel estimation (step 407). As described above, a channel estimated from an output value obtained through the operation with the matrix $U^H$ has a form similar to the matrix D according to the SVD scheme.

Further, a transmission eigenvector is selected according to the conditions of Equations 24 to 31 as described in FIG. 2 (step 409). Then, the calculated transmission eigenvector matrix V information and the transmission eigenvector selection information are feedback to the transmitter (step 411). As described above, when the system is the TDD system, the transmission eigenvector matrix V can be calculated in the transmitter. Accordingly, it may be impossible to feedback the transmission eigenvector matrix V.

As described above, the data transmission/reception method according to the embodiment of the present invention has been described with reference to FIGS. 3 and 4. A method for determining a transmission antenna from a value channel-estimated for each transmission antenna will now be described with reference to FIG. 5.

Figure 5:
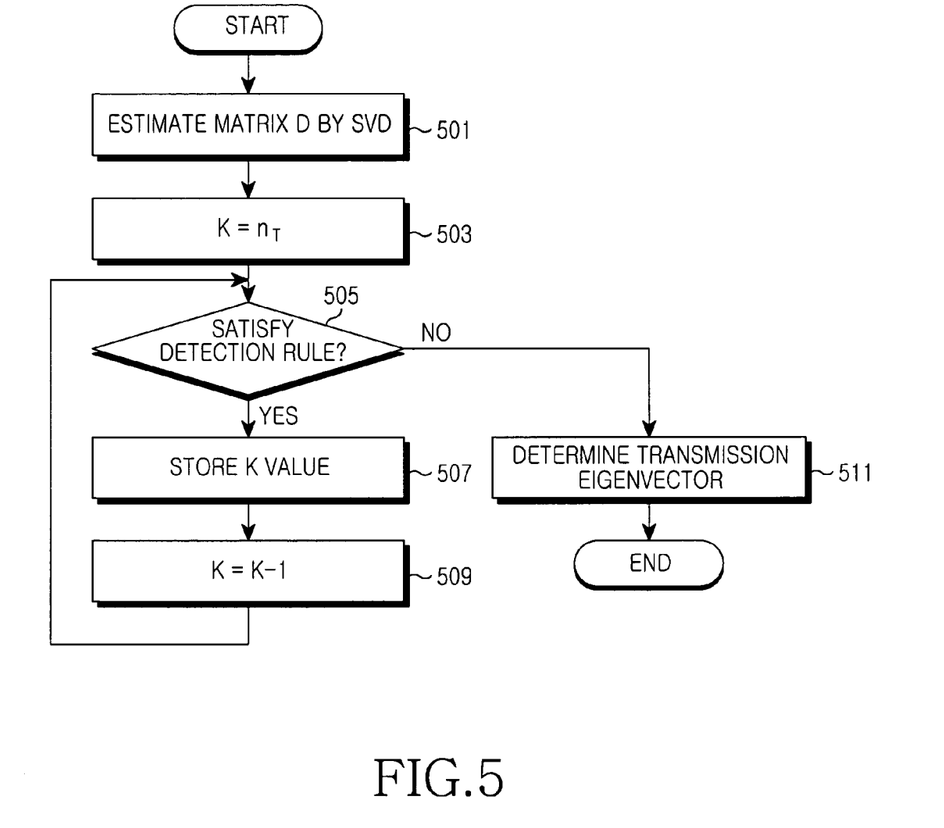
FIG. 5 is a flow diagram illustrating a transmission eigenvector selection method in a closed loop MIMO system according to an embodiment of the present invention.

FIG. 5 is a flow diagram illustrating a transmission eigenvector selection method in a closed loop MIMO system according to an embodiment of the present invention.

Referring to FIG. 5, a vector D is first estimated for the received data through an SVD (step 501). It is assumed that a K value is an $N_T$ (step 503). Then, whether to select a transmission eigenvector is determined each time after 1 is subtracted from the $N_T$ value. Further, eigenvectors to be selected are determined based on the aforementioned Equations 24 to 31 (step 505). The K value satisfying the conditions of Equations 24 to 31 is stored (step 507) and 1 is subtracted from the K value for inspection for the next λ (step 509). A transmission antenna corresponding to the stored K value is not used for data transmission.

When a channel condition is favorable for a predetermined λ value and thus the conditions are not satisfied (step 505), the conditions are not satisfied even for the next λ value. Accordingly, until the conditions are not satisfied, a transmission eigenvector not used for data transmission is finally determined as a transmission eigenvector for the stored k value (step 511).

Further, the determined transmission antenna information is transmitted to the transmitter and the transmitter does not use the corresponding transmission antenna in the next transmission. When a corresponding condition does not occur in the first comparison in the procedure, all antennas are used even in the next transmission.

In the present invention as described above, a transmission antenna is determined according to channel conditions in order to improve the reliability of the transmission in a closed loop MIMO system. This method is capable of solving the deterioration of the communication reliability when a channel does not have a full rank, which is the advantage of the conventional MIMO system. Further, when the method is applied to the next generation system, many advantages can be obtained. Furthermore, according to the present invention, an eigenvector corresponding to a high singular value is selected and transmitted in a closed loop MIMO system, thereby elevating the reliability in data transmission.

Although a preferred embodiment of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for transmitting/receiving data for use as feedback information in a singular value decomposition multi input multi output (SVD-MIMO) mobile communication system, the method comprising the steps of:
    determining eigenvectors using a singular value decomposition (SVD) of a channel matrix, selecting at least one eigenvector from among the eigenvectors using at least one of noise and error probability of received data, generating transmission eigenvector selection information included in the selected at least one eigenvector, and feedbacking the transmission eigenvector selection information to a transmitter; and
    receiving the feedback transmission eigenvector selection information, selecting transmission data according to the received transmission eigenvector selection information, mapping the selected transmission data to at least one transmission antenna, and transmitting the transmission data to a receiver;
    wherein the determined transmission eigenvector selection information is determined by, $$P_{e,j} = Q\left(\frac{d_{\min}}{2(\sigma_n/\lambda_j)}\right) < th$$

wherein $P_{e,j}$ denotes error probability, $d_{min}$ represents the shortest distance in a signal space of transmission data. $\sigma_n$ denotes variance value of channel, Q denotes Q function, and th denotes predetermined threshold.

2. The method as claimed in claim 1 wherein the determined transmission eigenvector selection information is determined by, $$\|n\| \geq \lambda_k d_0/2,$$

wherein n denotes a noise signal, $d_0$ denotes a minimum distance in the transmitter, and $\lambda_k$ denotes an eigenvalue of a channel for an $k^{th}$ transmission antenna.

3. The method as claimed in claim 1, wherein the transmission data mapped to the transmission antennas are calculated with a transmission eigenvector matrix according to a scheme of the SVD, and are then transmitted through the transmission antennas.

4. The method as claimed in claim 1, wherein the transmission antennas mapped to the transmission data are determined by comparing each eigenvalue of a diagonal matrix, according to a result of the SVD, with a predetermined threshold.

5. The method as claimed in claim 4, wherein the transmission antennas are sequentially determined from a smallest value to a largest value among the eigenvalues of the diagonal matrix.

6. The method as claimed in claim 4, wherein, in determining the transmission antennas, an antenna corresponding to a predetermined eigenvalue greater than a predetermined threshold is determined as an available transmission antenna, and transmission antennas corresponding to eigenvalues next to the predetermined eigenvalue are determined as available transmission antennas.

7. The method as claimed in claim 1, wherein the feedback eigenvector selection information is obtained from values, which are determined through an operation with a unitary matrix, according to a scheme of the SVD.

8. The method as claimed in claim 1, wherein the transmission eigenvector selection information is used to select data.

9. The method as claimed in claim 1, wherein the transmission eigenvector selection information is determined by estimating a channel condition according to each transmission antenna by means of the eigenvalues of a matrix D obtained by the SVD scheme, and the matrix D is the eigenvalues of a channel matrix H.

10. A method for transmitting data through a plurality of transmission antennas determined based on information feedback from a receiver in a singular value decomposition multi-input multi-output (SVD-MIMO) mobile communication system, the method comprising the steps of:
receiving transmission eigenvector selection information selected and feedback according to a predetermined transmission eigenvector selection method in the receiver; and
selecting transmission data according to the received transmission eigenvector selection information, mapping the selected transmission data to the transmission antennas, and transmitting the transmission data;
wherein the transmission eigenvector selection method determines eigenvectors using a singular value decomposition (SVD) of a channel matrix, selects at least one eigenvector from among the eigenvectors using at least one of noise and error probability of received data, and generates transmission eigenvector selection information included in the selected at least one eigenvector; and
wherein the determined transmission eigenvector selection information is determined by, $$P_{e,j} = Q\left(\frac{d_{\min}}{2(\sigma_n/\lambda_j)}\right) < th$$

wherein $P_{e,j}$ denotes error probability, $d_{min}$ represents the shortest distance in a signal space of transmission data, $\sigma_n$ denotes variance value of channel, Q denotes Q function, and th denotes predetermined threshold.

11. The method as claimed in claim 10, wherein the transmission eigenvector selection information estimates a channel condition according to each transmission antenna based on eigenvalues of a matrix calculated by a singular value decomposition (SVD) scheme.

12. The method as claimed in claim 11, wherein the eigenvalues according to said each channel condition are determined according to a result of a comparison of an error probability of a transmission signal and a predetermined reference value.

13. The method as claimed in claim 11 wherein the eigenvalues according to said each channel condition are determined by $$\|n\| \geq \lambda_k d_0/2,$$

wherein n denotes a noise signal, $d_0$ denotes a minimum distance in the transmitter, and $\lambda_k$ denotes an eigenvalue of a channel for an $k^{th}$ transmission antenna.

14. The method as claimed in claim 10, wherein the step of mapping the transmission data to the transmission antennas comprises a step of calculating the transmission data with a transmission eigenvector matrix determined according to the SVD scheme, and then transmitting the transmission data through the transmission antennas.

15. The method as claimed in claim 10, wherein the transmission antennas to which the transmission data are mapped are determined by comparing each eigenvalue of a diagonal matrix, according to a result of the SVD, with a predetermined threshold.

16. The method as claimed in claim 15, wherein the transmission antennas are sequentially determined from a smallest value to a largest value among the eigenvalues of the diagonal matrix.

17. The method as claimed in claim 10, wherein, in determining the transmission antennas, an antenna corresponding to a predetermined eigenvalue greater than a predetermined threshold is determined as an available transmission antenna, and transmission antennas corresponding to eigenvalues next to the predetermined eigenvalue are determined as available transmission antennas.

18. A method for receiving data transmitted through a plurality of transmission antennas in a singular value decomposition multi-input multi-output (SVD-MIMO) mobile communication system, the method comprising the steps of:
receiving data transmitted through transmission antennas;
determining eigenvectors using a singular value decomposition (SVD) for channel conditions between the transmission antennas and reception antennas;
selecting at least one eigenvector from among the eigenvectors using at least one of noise and error probability of received data;
generating transmission eigenvector selection information included in the selected at least one eigenvector;
determining an amount of transmission data according to the at least one selected eigenvector; and
feedbacking information on the determined amount of the transmission data to a transmitter;

wherein the determined transmission eigenvector selection information is determined by, $$P_{e,j} = Q\left(\frac{d_{\min}}{2(\sigma_n/\lambda_j)}\right) < th$$

wherein $P_{e,j}$ denotes error probability, $d_{min}$ represents the shortest distance in a signal space of transmission data, $\sigma_n$ denotes variance value of channel, Q denotes Q function, and th denotes predetermined threshold.

19. The method as claimed in claim 18, wherein the amount of transmission data is transmission eigenvector selection information.

20. The method as claimed in claim 18, wherein the singular value is determined by comparing each eigenvalue of a diagonal matrix, according to a result of the SVD, with a predetermined threshold.

21. The method as claimed in claim 18, wherein the information on the determined amount of the transmission data is feedback and transmitted together with an eigenvector obtained by performing the SVD for a channel matrix between the transmission antennas and reception antennas.

22. The method as claimed in claim 18, wherein the amount of the transmission data is determined by $$\|n\| \geq \lambda_k d_0/2,$$

wherein n denotes a noise signal, $d_0$ denotes a minimum distance in the transmitter, and $\lambda_k$ denotes an eigenvalue of a channel for an $k^{th}$ transmission antenna.

23. The method as claimed in claim 18, further comprising the steps of performing a channel estimation through data received from the transmission antennas, and performing the SVD for a channel matrix obtained through the channel estimation.

24. The method as claimed in claim 18, further comprising the steps of performing an operation with a unitary matrix for the transmitted data, and performing the SVD for a channel matrix estimated from an output value of the operation.

25. The method as claimed in claim 18, wherein the amount of the transmission data is determined by comparing each eigenvalue of a diagonal matrix, according to a result of the SVD, with a predetermined threshold.

26. The method as claimed in claim 18, wherein the transmission data is sequentially determined from a smallest value to a largest value among the eigenvalues of a diagonal matrix.

27. The method as claimed in claim 26, wherein, in determining the transmission data, data corresponding to a predetermined eigenvalue greater than a predetermined threshold is determined as available transmission data, and transmission data corresponding to eigenvalues next to the predetermined eigenvalue are determined as available transmission data.

28. An apparatus for transmitting data through a plurality of transmission antennas in a singular value decomposition multi input multi output (SVD-MJMO) mobile communication system, the apparatus comprising:

a transmission data selector for performing a singular value decomposition (SVD) for a channel matrix between transmission antennas and reception antennas, receiving transmission eigenvector selection information, and selecting transmission data according to the received transmission eigenvector selection information; and a preprocessor for multiplying the transmission data selected by the transmission data selector by a matrix including the transmission eigenvectors, and mapping the transmission data to the transmission antennas;

wherein the transmission eigenvector selection information includes at least one eigenvector, and the at least one eigenvector is selected from among eigenvectors determined by a singular value decomposition for the channel matrix according to at least one of noise and error probability of data received by receiver;

wherein the determined transmission eigenvector selection information is determined by, $$P_{e,j} = Q\left(\frac{d_{\min}}{2(\sigma_n/\lambda_j)}\right) < th$$

wherein $P_{e,j}$ denotes error probability, $d_{min}$ represents the shortest distance in a signal space of transmission data, $\sigma_n$ denotes variance value of channel, Q denotes Q function, and th denotes predetermined threshold.

29. The method as claimed in claim 28, wherein the transmission eigenvector selection information is determined by $$\|n\|\lambda_k d_0/2,$$

wherein n denotes a noise signal, $d_0$ denotes a minimum distance in the transmitter, and $\lambda_k$ denotes an eigenvalue of a channel for an $k^{th}$ transmission antenna.

30. The apparatus as claimed in claim 28, wherein the transmission data selector selects the transmission data based on a number of the selected transmission eigenvectors by use of the transmission eigenvector selection information feedback from a receiver.

31. The apparatus as claimed in claim 28, wherein, in mapping the transmission data to the transmission antennas, the preprocessor calculates the transmission with an eigenvector matrix and then maps only information data corresponding to a number of the selected transmission eigenvectors to the transmission antennas.

32. The apparatus as claimed in claim 31, wherein a number 0 is input to remaining data except for the information data corresponding to the number of the selected eigenvectors.

33. The apparatus as claimed in claim 28, wherein the transmission antennas mapped to the transmission data are determined by comparing each eigenvalue of a diagonal matrix, according to a result of the SVD, with a predetermined threshold.

34. The apparatus as claimed in claim 33, wherein the transmission antennas are sequentially determined from a smallest value to a largest value among the eigenvalues of the diagonal matrix.

35. The apparatus as claimed in claim 33, wherein, in determining the transmission antennas, an antenna corresponding to a predetermined eigenvalue greater than a predetermined threshold is determined as an available transmission antenna, and transmission antennas corresponding to eigenvalues next to the predetermined eigenvalue are determined as available transmission antennas.

36. The apparatus as claimed in claim 28, wherein the feedback eigenvector selection information is obtained from values, which are determined through an operation with a unitary matrix, according to the SVD.

37. An apparatus for receiving data transmitted through a plurality of transmission antennas in a singular value decomposition multi-input multi-output (SVD-MIMO) mobile communication system, the apparatus comprising:

a singular value decomposer for performing a singular value decomposition (SVD) for a channel matrix between transmission antennas and reception antennas; and a transmission eigenvector determiner for selecting at least one eigenvector from among the eigenvectors using at least one of noise and error probability of received data, generating transmission eigenvector selection information included the selected at least one eigenvector, and feedbacking the transmission eigenvector selection information to a transmitter;

wherein the determined transmission eigenvector selection information is determined by, $$P_{e,j} = Q\left(\frac{d_{\min}}{2(\sigma_n/\lambda_j)}\right) < th$$

wherein $P_{e,j}$ denotes error probability, $d_{min}$ represents the shortest distance in a signal space of transmission data, $\sigma_n$ denotes variance value of channel, Q denotes Q function, and th denotes predetermined threshold.

38. The apparatus as claimed in claim 37, wherein the transmission eigenvector selection information is selection information related to an amount of transmitted data

39. The apparatus as claimed in claim 37, wherein the transmission eigenvector determiner feedbacks and transmits the determined transmission eigenvector selection information together with an eigenvector obtained by performing the SVD for a channel matrix between the transmission antennas and reception antennas.

40. The apparatus as claimed in claim 37, wherein the transmission eigenvector is determined by $$\|n\|\lambda_k d_0/2,$$

wherein n denotes a noise signal, $d_0$ denotes a minimum distance in the transmitter, and $\lambda_k$ denotes an eigenvalue of a channel for an $k^{th}$ transmission antenna.

41. The apparatus as claimed in claim 37, further comprising a post-processor for calculating the data received from the transmission antennas by using a unitary matrix determined according to a scheme of the SVD.

42. The apparatus as claimed in claim 37, further comprising a channel estimator for performing a channel estimation based on the data received from the transmission antennas, and providing output values obtained by the channel estimation to the post-processor.

43. The apparatus as claimed in claim 37, wherein the transmission eigenvector is sequentially determined from a smallest value to a largest value among the eigenvalues of the diagonal matrix.

44. The apparatus as claimed in claim 37, wherein, in determining the transmission eigenvectors, an eigenvector corresponding to a predetermined eigenvalue greater than a predetermined threshold is determined as an available transmission eigenvector, and transmission eigenvectors corresponding to eigenvalues next to the predetermined eigenvalue are determined as available transmission eigenvectors.

* * * * *